United States Patent [19]
Horton

[11] 3,864,834
[45] Feb. 11, 1975

[54] AUTOMATIC CENTERING HEIGHT GAUGE ATTACHMENT

[76] Inventor: Herbert C. Horton, 866 N. Prior Ave., St. Paul, Minn. 55104

[22] Filed: Mar. 4, 1974

[21] Appl. No.: 448,535

[52] U.S. Cl............................. 33/169 R, 33/172 B
[51] Int. Cl. ............................................. G01b 5/14
[58] Field of Search ............ 33/168, 170, 171, 172, 33/169 R

[56] References Cited
UNITED STATES PATENTS

| | | | |
|---|---|---|---|
| 2,626,463 | 1/1953 | Deakin | 33/171 |
| 3,224,103 | 12/1965 | Kiralfy | 33/172 R |
| 3,802,084 | 4/1974 | Fortado | 33/172 D |

FOREIGN PATENTS OR APPLICATIONS

| | | | |
|---|---|---|---|
| 124,109 | 2/1949 | Sweden | 33/172 B |

Primary Examiner—Harry N. Haroian
Attorney, Agent, or Firm—Neil B. Schulte

[57] ABSTRACT

An attachment for a height measuring gauge comprising a housing and a centering probe for insertion in a hole, the probe being pivotally mounted in the housing and bearing against a dial indicator to show when the centering probe is exactly centered in the hole.

8 Claims, 4 Drawing Figures

PATENTED FEB 11 1975  3,864,834

AUTOMATIC CENTERING HEIGHT GAUGE ATTACHMENT

BACKGROUND OF THE INVENTION

In the prior art it is common to specify the location of holes in a piece of work by the coordinate positions at their centers relative to one or more edges. These holes may be horizontally and vertically centered at varying distances. Thus, the hole centers are typically located by a height gauge which is moveable up and down so as to bring a scribing point to the correct height. The horizontal location is likewise determined but with the piece of work resting in a different reference position. Once the hole is formed, it is difficult to determine where the center of the hole is and to solve this problem tapered centering probes have been utilized which are inserted into the hole until they touch the two opposite walls of the hole. It is then presumed that the probe is approximately centered in the hole. The problem with this is that the probe may be inserted at a slight angle and come to rest in a non-horizontal position so that the actual center of the hole is not being properly measured. In order to solve this problem the prior art has proposed centering probes which have various attachments on them to determine if they are level. In general, however, these attachments have not worked well since they do not show the amount of error involved but only whether or not they are centered and further because of their design characteristics do not operate over a wide range of hole sizes. In fact, the prior art devices have some size holes for which they give deceptive measurements. My invention overcomes these disadvantages by providing a centering probe which is readily attachable to a conventional prior art height gauge and shows exactly how far from centered it is.

SUMMARY OF THE INVENTION

Briefly, the present invention contemplates a centering probe constructed in a substantially stronger manner than that found in the prior art. The probe is pivoted inside a steel housing block with the pivot point at a location quite remote from the hole so as to insure that the device works properly throughout its range of hole sizes. The exact level position of the centering probe is determined by a dial indicator which is mounted in the housing to bear against the pivoting probe at a point between the hole and the pivot point. The bottom of the probe is mounted parallel and flush to the bottom of the housing so that the dial gauge may be quickly centered simply by lowering the attachment onto a flat surface and zeroing the dial indicator. It may therefore be seen that it is an object of my invention to provide an improved measuring device. It is a further object of my invention to provide an improved easily centered probe for determining the exact location of hole centers in a piece of stock. Further objects and advantages will become apparent from the following description and drawings.

DESCRIPTION OF THE PREFERRED EMBODIMENT

Figure 1:
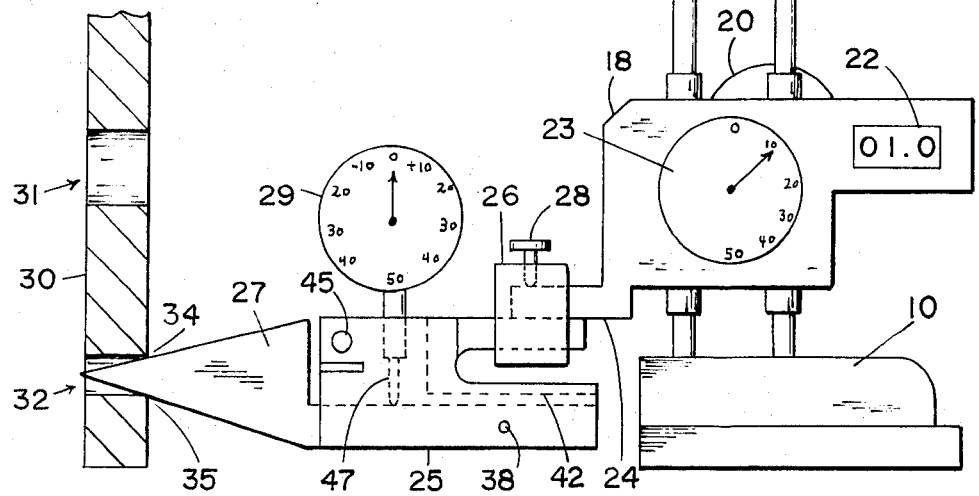
FIG. 1 is an elevational view of a preferred embodiment of my invention showing the probe attachment mounted on a conventional height gauge.

In FIG. 1 a typical prior art height gauge is shown comprising a base 10 having a pair of columns 12 and 14 extending upwards therefrom and connected together at the top by means of a member 15. Column 12 has a series of small linear teeth 16 along its inside edge so that a carriage 18 may slide along the columns 12 and 14 powered by a suitable thumb wheel 20 on the back side of carriage 18. As the carriage 18 moves along, its exact displacement is indicated by a digital meter 22 and a vernier dial indicator 23. Such height meters may be purchased readily in the market place today and can be read as accurately as one ten thousandth of an inch. The height guage utilized in FIG. 1 has a small arm 24 extending out from the lower edge. In the prior art, it is common to fasten a scriber or sharp point to arm 24 by means of a sleeve 26 and set screw 28. For the purpose of the present invention, however, the scriber is removed and instead the attachment of the present invention is connected to arm 24 by means of sleeve 26 and set screw 28.

The present invention comprises the attachment on the end of arm 24 which includes a housing 25 and a centering probe 27. As mentioned earlier if one wants to measure the center position of a hole such as holes 31 and 32 in member 30 a symetric probe such as probe 27 must be inserted into the hole in order to contact the edges of the hole at two locations such as shown in FIG. 1 by numbers 34 and 35. The exact center position of the hole, however, is only indicated if probe 27 is inserted in a absolutly horizontal position. In the alternative, it is possible that the probe 27 can be used in a non-horizontal position but then it must be made certain that it is always used at exactly the same angle.

Figure 2:
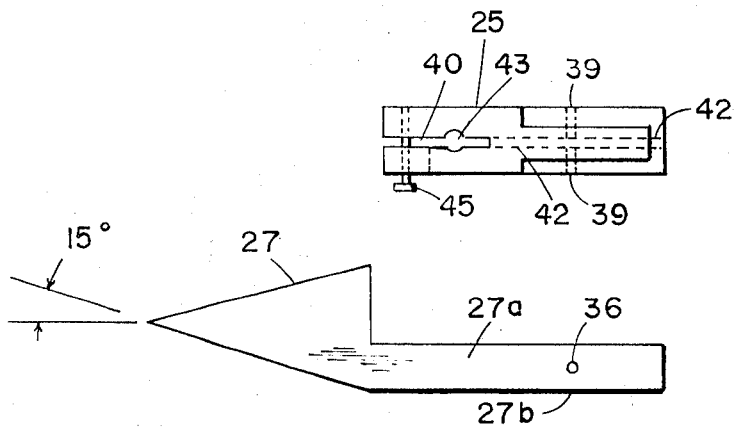
FIG. 2 is a top view of just the housing for the attachment.
Figure 3:
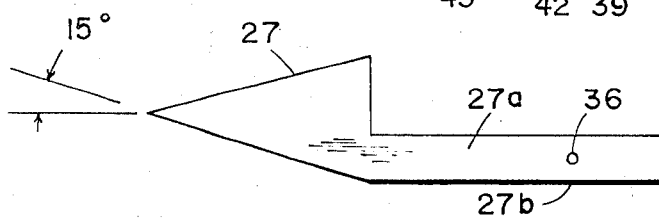
FIG. 3 is a detail view of the probe element itself.

Referring to FIGS. 2 and 3 along with FIG. 1 it may be seen that probe 27 is provided with a small hole 36 therethrough so that probe 27 may be carried about a pivot pin 38 inserted in a hole 39 in housing 25. It may be seen in FIG. 2 that housing 25 is provided with a vertical slot 40 extending downward through the probe end and additionally provided with a horizontal slot defined by the dashed line 42 in FIGS. 1 and 2. The extended arm 27a of probe 27 lies in slot 42 as shown in FIG. 1 flush with the bottom of housing 25.

Slot 40 in housing 25 is enlarged to provide a hole 43 within which a dial indicator 29 is inserted. Indicator 29 is held in place by means of a tightening screw 45 in a manner well known to those skilled in the art. Dial indicator 29 is a common prior art item that may be readily purchased. Indicator 29 measures distance in extremely small increments as the plunger 47 is pushed inward or allowed to spring outward. As can be seen in FIG. 1 arm 27 bears against the bottom of plunger 47 as it pivots about pin 38 in housing 25. Thus, the exact horizontal angle of probe 27 may be readily seen by reference to dial indicator 29. The bottom edge 27b of probe arm 27a is designed to be exactly flush with the bottom edge of housing 25. In this position probe 27 can pivot about pin 38 only for a limited distance in either direction before striking the top of slot 42 in housing 25.

In operation the height gauge is simply lowered until the attachment comes to rest on the working surface. Probe 27 is then aligned with housing 25 by means of its bottom edge 27b. Dial indicator 29 is then set to zero as shown in FIG. 1 either by moving the indicator 29 up or down while locking screw 45 is loosened or by rotating suitable adjustment mechanisms in dial indicator 29 in a manner well known to those skilled in the art. At the same time, the digital guage 22 and the vernier scale 23 on the height guage may be set to zero. Thumb wheel 20 is then rotated to raise the height gauge a predetermined distance and the point of probe 27 used to score and mark the location of a hole. Once the hole is drilled, its position may be checked by inserting probe 27 into the hole. Thumb wheel 20 is used to move the height guage up and down until dial indicator 29 indicates zero demonstrating that probe 27 is once again exactly horizontal or centered in the hole. The height may then be read from digital guage 22 and vernier guage 23. This is the position of the apparatus as shown in FIG. 1.

To check the distance between holes 32 and 31 in member 30 the probe is withdrawn and the height guage raised. The probe is positioned in hole 31 and again the height guage adjusted to bring guage 29 to zero. The exact change in height between the holes is then ascertained on the digital guage 22 and the vernier gauge 23. In order to measure the horizontal displacement between holes 31 and 32 it is necessary to rotate the member 30 to a new position or in the alternative to rotate the height gauge and measuring mechanism to a new position in a manner well known to those skilled in the art.

Figure 4:
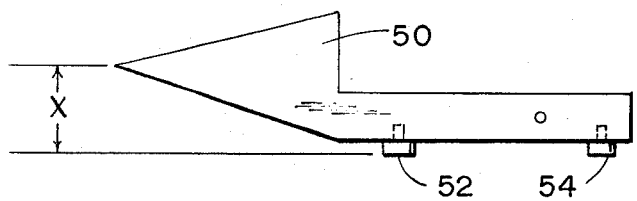
FIG. 4 is a detail view of another possible probe design wherein adjustable stops are provided in the bottom to permit the point of the probe to be located at an exact predetermined distance above the working surface.

In FIG. 4 an additional variation of the invention is shown. A probe 50 similar in design to the probe of FIG. 3 is provided but including a pair of adjustable stops 52 and 54 which may be screwed into the bottom of the probe, or pressed in place, or otherwised fastened thereon. The bottom surfaces of the stops 52 and 54 may be appropriately milled to insure that the distance X is an exact predetermined number such, as for example, 1 inch. Thus, when the probe is brought to rest on a working surface the operator knows that the point is exactly one inch above the working surface. As the probe is moved to a new position calculations are made somewhat more easier. Stops 52 and 54 also permit probe 50 to be leveled in the event that it is not quite flush with housing 25.

In the preferred embodiment shown the probes use a point with approximately a 30° angle. The probe is symmetric so that the top surface extends upward approximately 15° from level whereas the bottom surface extends downward 15° from level. Different angles could, of course, be used but 30° has been found to provide a probe which works well over a large range of hole sizes typically encountered in the machining arts. It is clear, however, that a number of such small design changes could be made to the apparatus shown without departing from the spirit and scope of the invention and therefore I do not intend to be limited by the drawings except as defined in the appended claims.

I claim

1. An attachment to be used with a height gauge for measuring the locations of holes in a piece of stock comprising in combination:
    a housing having means thereon to connect said housing to the height gauge and further having a pivot support therein;
    a tapered probe pivoted about the pivot support in said housing, said probe being tapered at a first end so as to be insertable in the hole to be measured and having a pivot support engaging structure at the other end, and a linear distance measuring gauge mounted in said housing so as to bear against said probe at a point between the first end and the other end.

2. The apparatus of claim 1 in which said linear distance measuring gauge comprises a distance measuring dial indicator.

3. The apparatus of claim 1 in which said housing has a slot therein within which the other end of said probe is positioned, said slot limiting the pivoting movement of said probe about said pivot support.

4. The apparatus of claim 1 including adjustable stops in the bottom of said tapered probe.

5. The apparatus of claim 2 including adjustable stops in the bottom of said tapered probe.

6. The apparatus of claim 3 including adjustable stops in the bottom of said tapered probe.

7. The apparatus of claim 3 in which said linear distance measuring gauge comprises a distance measuring dial indicator.

8. The apparatus of claim 7 including adjustable stops in the bottom of said tapered probe.

* * * * *